United States Patent
Clauson

(10) Patent No.: US 7,062,088 B1
(45) Date of Patent: Jun. 13, 2006

(54) VARIABLE LOSSY COMPRESSION

(75) Inventor: Jon D. Clauson, Maple Grove, MN (US)

(73) Assignee: Adobe Systems Incorporated, San Jose, CA (US)

( * ) Notice: Subject to any disclaimer, the term of this patent is extended or adjusted under 35 U.S.C. 154(b) by 967 days.

(21) Appl. No.: 09/942,048

(22) Filed: Aug. 28, 2001

(51) Int. Cl.
*G06K 9/36* (2006.01)

(52) U.S. Cl. .................. 382/166; 382/233; 382/239; 382/251; 358/517; 358/426.14; 345/626; 345/563; 375/240.02; 375/240.08

(58) Field of Classification Search ............... 382/166, 382/167, 232, 239, 251, 244, 238, 233, 294, 382/284, 283, 282; 345/626, 629, 563; 341/63, 341/55, 67; 358/517, 518, 426.13, 426.14, 358/426.04; 348/384.1, 391.1, 394.1; 375/240.01, 375/240.02, 240.03, 240.08, 240.12
See application file for complete search history.

(56) References Cited

U.S. PATENT DOCUMENTS

| | | | |
|---|---|---|---|
| 4,558,302 A | | 12/1985 | Welch |
| 5,181,014 A | | 1/1993 | Dalrymple et al. |
| 5,751,450 A | | 5/1998 | Robinson |
| 5,990,864 A | | 11/1999 | DeAguiar et al. |
| 6,128,406 A | * | 10/2000 | Ostrovsky ............... 382/166 |
| 6,442,523 B1 | * | 8/2002 | Siegel ................... 704/270 |
| 2002/0090140 A1 | * | 7/2002 | Thirsk ................... 382/239 |
| 2002/0196848 A1 | * | 12/2002 | Roman ................. 375/240.08 |
| 2004/0022321 A1 | * | 2/2004 | Satoh et al. ........... 375/240.19 |

OTHER PUBLICATIONS

Chiang, S.W. and Po, L.M., "Adaptive Lossy LZW Algorithm For Palettized Image Compression," *IEE Electronics Letters*, vol. 33, No. 10, pp. 852–854, May 8, 1997.

Arnaud, D. and Szpankowski, W., "Pattern Matching Image Compression with Predication Loop: Preliminary Experimental Results," *Proc. Data Compression Conference*, Snowbird, 1997, Purdue University, CSD–TR–96–069, 1996; also: http://www.cs.purdue.edu/homes/spa/reports.html, pp. 1–14, Nov. 11, 1996.

Constantinescu, C. and Storer, J.A., "Improved Techniques for Single–Pass Adaptive Vector Quantization," *Proceedings of the IEEE*, vol. 82, No. 6, pp. 933–939, Jun. 1994.

"Adobe Photoshop™ Tips," http://www.thedesktop.com/tip01.html, pp. 1–3, 1999.

"A Basic Introduction to PNG Features,"http://www.libpng.org/pub/png/pngintro.html, pp. 1–7, 1996.

Luczak, T. and Szpankowski, W., "A Suboptimal Lossy Data Compression Based on Approximate Pattern Matching," *IEEE Trans. on Information Theory*, vol. 43, pp. 1439–1451, 1997; also http://www.cs.purdue.edu/homes/spa/publications.html, pp. 1–28, Aug. 5, 1996.

(Continued)

*Primary Examiner*—Kanjbhai Patel
*Assistant Examiner*—Ali Bayat
(74) *Attorney, Agent, or Firm*—Fish & Richardson P.C.

(57) ABSTRACT

Methods and apparatus for generating a compressed image from a source image by compressing the source image using a dictionary based lossy compression algorithm that regionally varies the amount of information loss from the source image based on regional image quality levels contained in an image quality mask. The image quality mask can be an alpha channel of the source image, can be stored as a raster map, or can be stored as a resolution independent function. The regional image quality levels in the image quality mask can be determined by a user, automatically generated from the image, or automatically generated from user input. The dictionary based lossy compression algorithm can be a lossy Lempel-Ziv-Welch (LZW) compression algorithm.

24 Claims, 3 Drawing Sheets

OTHER PUBLICATIONS

M. Attalah, et al.; "Pattern Matching Image Compression: Algorithmic and Empirical Results"; *IEEE Trans. On Pattern Analysis and Machine Intelligence*; vol. 21, pp. 614–627, Jul. 1999.

C. Wayne Brown and Barry J. Shepherd; "Graphics File Formats Reference and Guide", Chap. 9, pp. 184–190, Manning Pubs. 1995.

Steven Pigeon; "An Optimizing Lossy Generalization of LZW"; *Proceedings DDC 2001, Data Compression Conference*; p. 509; presented Mar., 2001.

Steven Pigeon; "An Optimizing Lossy Generalization of LZW", Preprint accessible at http://www.iro.umontreal.ca/~pigeon/ before Jun. 14, 2001; pp. 1–8.

* cited by examiner

VARIABLE LOSSY COMPRESSION

BACKGROUND

This invention relates to creating a compressed electronic image using a dictionary or table based variable lossy compression algorithm.

Electronic images are often transmitted from one user to another over a data network. The speed of transmission depends in part on the size of the image being transmitted and can be reduced by reducing the image's size. One way to reduce an image's size is to compress it. A common algorithm for compressing an image, referred to as a dictionary or table based compression algorithm, works by storing a dictionary or table of all of the unique strings that occur in an image together with references to where those strings occur in the image.

A common dictionary based compression algorithm is the Lempel-Ziv-Welch (LZW) algorithm. The LZW algorithm is used to compress and store images in the Graphical Interface Format (GIF), and works by comparing strings of bytes in a file undergoing compression to strings of bytes in the file that have already been processed. When a unique string of bytes is found, that string is added to a compression table in an associated compressed file together with a much smaller string identifier that uniquely identifies it. When a non-unique string of bytes is found, i.e. when a string of bytes is found which already exists in the compressed file's compression table, a new byte from the file undergoing compression is added to it. The elongated string is then compared to the existing byte strings in the compression table, and is either added to the compression table together with a unique string identifier if it does not already exist in the compression table, or is further elongated with another byte from the file undergoing compression if it already exists in the compression table. The LZW compression algorithm is a lossless compression algorithm since no data is lost when a file is compressed.

The LZW compression algorithm can be modified to provide a lossy mode of operation in which two or more different byte strings in a file undergoing compression are represented by the same string identifier in the compression table of a corresponding compressed file. The modified, or lossy-LZW algorithm operates by comparing a byte string in a file undergoing compression to byte strings that are stored in the file's compression table, and determining whether the two byte strings are sufficiently different to warrant storing the byte string together with a new string identifier in the compression table. If the byte string is not sufficiently different from a byte string already stored in the compression table, it is represented by the same string identifier representing the existing compression table byte string. As a result, the information content of byte strings that are different from, but not sufficiently different from previously stored compression table byte strings is lost in the compressed file.

User can currently control the amount of loss that can occur in an image undergoing lossy compression or conversion to e.g. a GIF format on a per file basis by specifying the extent to which a byte string in a source image must be different from a byte string stored in the image's compression table to warrant adding the byte string and a string identifier to the compression table. The more the byte string is allowed to differ from byte strings in the compression table, the greater the allowed information loss in the compressed image. While users can therefore currently control the amount of information loss to an image undergoing e.g. GIF compression on a per file basis, they cannot currently control the amount of information loss on a regional basis within a file undergoing compression or conversion.

SUMMARY

In general, in one aspect, the invention provides methods and apparatus implementing a technique for generating a compressed image from a source image by compressing the source image using a dictionary based lossy compression algorithm that regionally varies the amount of information loss from the source image. Advantageous implementations of the invention include one or more of the following features. The amount of information loss from the source image can be stored as a plurality of regional image quality levels in an image quality mask. The regional image quality levels can specify the degree to which information in corresponding regions of the source image can be lost when generating the compressed image. The image quality mask can be an alpha channel of the source image. The image quality mask can be stored as a raster map. Alternatively, the image quality mask can be stored as a resolution independent function. The image quality mask and corresponding image quality levels can be determined by a user. Alternatively, they can be automatically generated from the source image, or they can be automatically generated from user input. The lossy compression algorithm can be a lossy Lempel-Ziv-Welch (LZW) compression algorithm. The technique may be implemented as a set of program instructions tangibly embodied on a computer readable storage medium.

In general, in another aspect, the invention provides methods and apparatus for generating a compressed image having a regionally variable compression level from a source image by: creating a search string by concatenating the color value of each pixel in the source image to the end of a prefix string; determining an image quality value from a corresponding pixel in an image quality mask associated with the source image; searching the compression table for a color string that matches the search string; writing the search string to the prefix string when a matching color string is found; and generating an identification string to associate with the search string; writing the identification string and the search string to the compression table; writing the identification string associated with the prefix string to the compressed image file; and setting the prefix string to the pixel's color value whenever a matching color string cannot be found.

Advantageous implementations of the invention include one or more of the following features. The compressed image can be initialized with a compression table comprising a palletized table of colors and a plurality of identification strings respectively corresponding to each of the colors in the palletized table of colors. The prefix string can be initialized with the color value of the first pixel in the source image. The image quality value can represent the maximum allowable difference between the search string and a color string stored in the compression table. A compression table color string can match a search string when a distance metric between the color string and the search string is smaller than the image quality value or some function of the image quality value. The distance metric can be a perceptual color distance metric. The technique may be implemented as a set of program instructions tangibly embodied on a computer readable storage medium.

Advantages of the invention include one or more of the following. The invention allows a user to specify image quality and image fidelity on a regional basis within an image. The regional basis can be a per pixel basis. A user can determine an appropriate trade-off between image quality or image fidelity and image compressibility on a regional or per pixel basis. The invention allows a user to compress an image having different regions with different information fidelity requirements at different compression ratios. The user can thereby optimize the competing interests of minimizing the size of the compressed image, while maximizing its information content or fidelity to the uncompressed image.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Images often contain different regions having different information fidelity requirements. For example, portraits have recognizable background and foreground regions. The information content in the background region is generally of little interest to a viewer, and need not be faithfully reproduced. Conversely, the information content in the foreground regions are generally of great interest to a viewer, and need to be reproduced as faithfully as possible.

Figure 1:
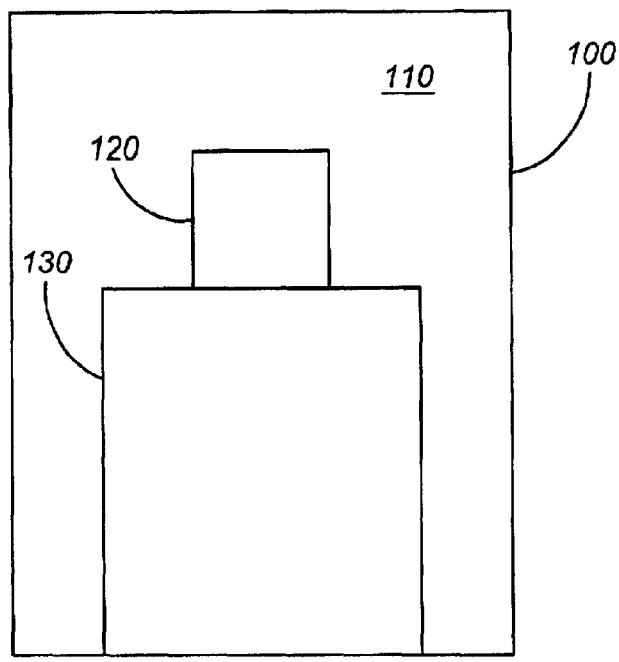
FIG. 1 is a schematic illustration of an image having a plurality of regions with different information fidelity requirements.

FIG. 1 is a schematic illustration of an electronic portrait image 100, having a background region 110, and a foreground region consisting of a face region 120, and a torso region 130. Background region 110 will in general have little information content and will be neither particularly interesting, nor important to conveying the principal information content of image 100. For example, background region 110 may contain information about the shape, size, texture, and color of the backdrop cloth used to take portrait image 100. Conversely, the information content in the face region 120 and torso region 130 of portrait 100 will in general be large and of great interest to those who may want to view the image.

Electronic image 100 may reside on the computer hard drive of its owner. The owner may wish to send image 100 to a viewer at a remote location, for example by emailing it to him or her. To minimize the time it takes to send and receive image 100, the owner may wish to first reduce the size of the image by compressing it or converting it to, e.g., a GIF file. To preserve the fidelity of image 100, the owner may wish to use a lossless LZW compression algorithm when making the GIF conversion. However, the losslessly compressed GIF file may still be larger than desired. The owner can convert the image to an even smaller GIF file using a lossy LZW compression algorithm. Since image 100 has different regions with different information fidelity requirements, different regions of the image can be compressed with different image quality levels. For example, regions with high information fidelity requirements can be compressed with high image quality levels, while regions with low information fidelity requirements can be compressed with low image quality levels. Compressing different regions of image 100 with different image quality levels allows the owner to optimize the competing interests of minimizing the size of the compressed image, while maximizing its information content.

Figure 2:
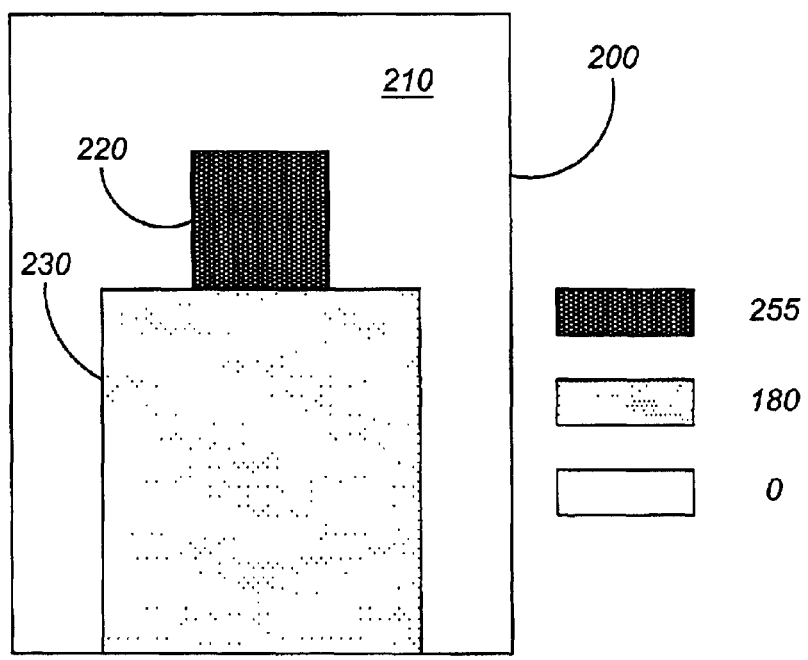
FIG. 2 is a schematic illustration of a image quality compression mask associated with an image having regions with different information fidelity requirements.

As shown in FIG. 2, to variably alter the acceptable amount of information loss when converting image 100 to a GIF file, an image quality mask 200 corresponding to source image 100 is created. The pixels in image quality mask 200 can have a one-to-one correspondence with the pixels in source image 100. Image quality mask 200 can be created and stored as an alpha channel of image 100, i.e., image quality mask 200 can be created as a part of image 100 and stored in the same file as the image. Alternatively, image quality mask 200 can be created and stored in a separate file from image 100 such that the two files are linked together by an operating system, a database, or through an image compression application. Image quality mask 200 is created with image quality regions 210, 220, and 230, corresponding to regions 110, 120, and 130 of source image 100, respectively. Image quality mask 200 contains a plurality of image quality levels specifying the degree to which the GIF compression application can identify a byte string in image 100 with a different byte string stored in the compression table of the converted GIF file. The different image quality levels specified in regions 210, 220, and 230 specify the different degrees to which the GIF compression application can represent byte strings in regions 110, 120, and 130 of source image 100 with a different byte string stored in the compression table of the output GIF file.

Image quality mask 200 can be automatically created when image 100 is created. Alternatively, image quality mask 200 can be created independently of image 100. Image quality mask 200 can be created by hand, e.g., by painting the variable image quality regions in the image quality mask, by inputting image quality levels on a per pixel basis, or by selecting one or more image quality regions within image 100 and inputting respective image quality levels within each selected image quality region. Image quality mask 200 can be stored as a pixel array. Each pixel in the array can be represented as an 8-bit word, allowing image quality mask 200 to specify 256 discrete image quality levels in the conversion of image 100. Alternatively, image quality mask 200 can be stored as a resolution independent object or function that is rasterized when image 100 is rendered. Image quality mask 200 can be generated from one or more functions that can be preprogrammed or selected by a user. For example, image quality mask 200 can be generated as a 3-dimensional Guassian function with amplitude A and mean $\mu$ that is centered about point p in image 100. Amplitude A, mean $\mu$ and point p can be received as user input.

Figure 3:
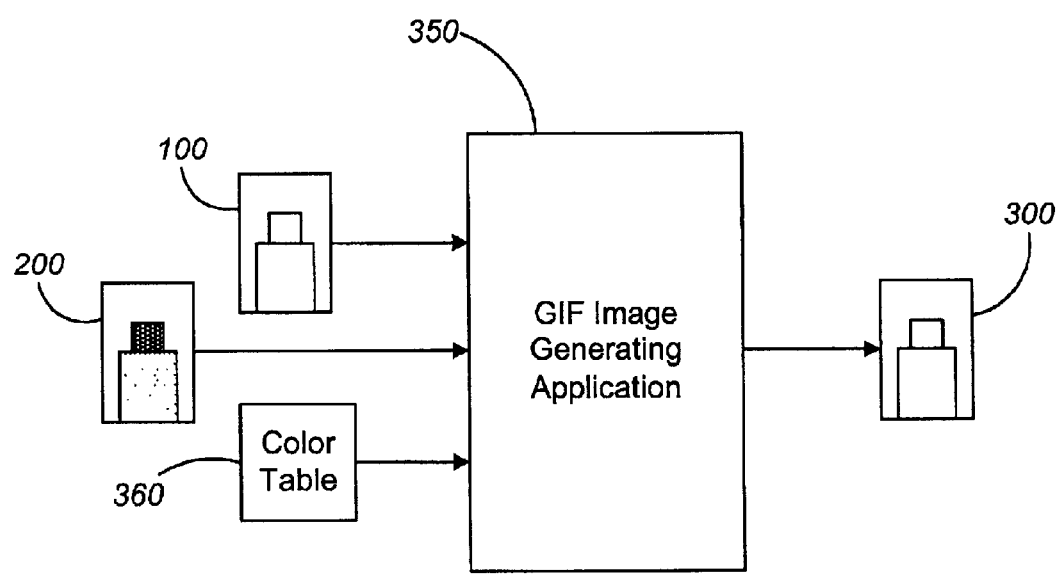
FIG. 3 is a schematic illustration of an application capable of creating a GIF file from an image having regions with different information fidelity requirements.

FIG. 3 shows a GIF compression application 350 capable of converting source image 100 to a lossy GIF image 300, using variable image quality mask 200 and the limited colors available in color table 360. Lossy GIF image 300 has variable image quality regions 310, 320, and 330, corresponding to regions 110, 120, and 130, respectively, of source image 100, and to image quality level regions 210, 220, and 230, respectively, of image quality mask 200. In one implementation, GIF compression application 350 receives as input image 100, corresponding image quality mask 200, and color table 360. In another implementation, GIF compression application 350 receives as input image 100 and image quality mask 200, and creates color table 360 from the predominant colors in image 100. In yet another implementation, GIF compression application 350 receives input image 100, and generates and creates image quality mask 200 or color table 360 from the colors in image 100.

GIF compression application 350 produces lossy GIF image 300 by applying a lossy compression algorithm to image 100, where the amount of loss in a given region of image 100 is determined by the variable image quality level specified in a corresponding region of image quality mask 200. The lossy compression algorithm can be a lossy LZW compression algorithm or any other lossy dictionary or table based compression algorithm. The maximum amount of loss in a byte string in a region of lossy GIF image 300 is controlled by the image quality level specified in a corresponding region of image quality mask 200. For example, image quality region 230 of image quality mask 200 can specify an image quality level of 100 to indicate no loss is acceptable in the face region 130 of image 100. Specifying an image quality level of 100 is useful in regions such as face region 130 where the information content is of critical interest to a viewer of image 100. Since no loss is acceptable in region 130, GIF compression application 350 stores each unique byte string in region 130 of source image 100 together with a unique string identifier in the compression table of lossy GIF image 300. Thus region 330 of GIF image 300 contains identical information to the information stored in region 130 of image 100.

Figure 4:
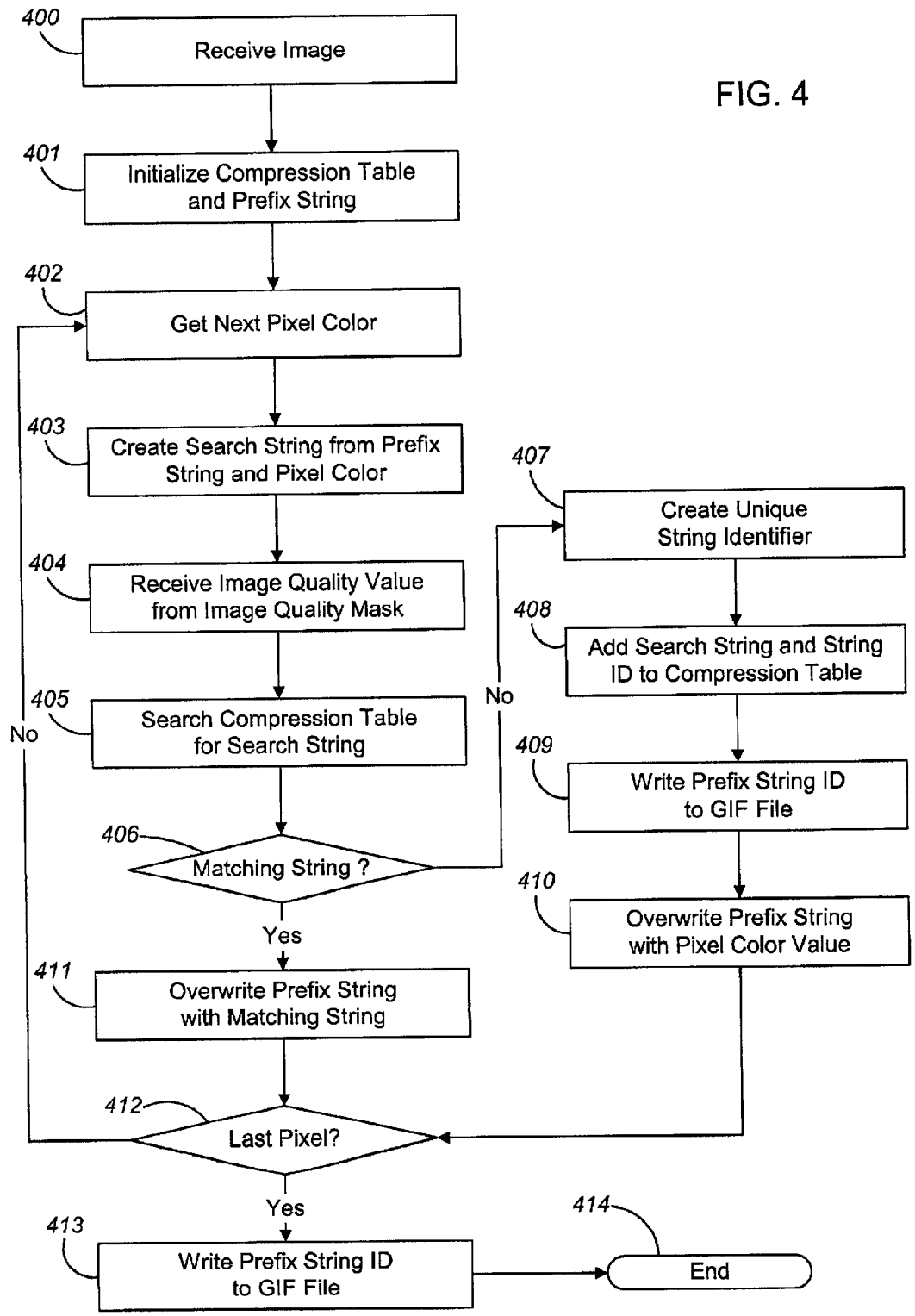
FIG. 4 is a flowchart depicting a method by which an application can create a GIF file from an image having regions with different information fidelity requirements.

FIG. 4 is a flow chart for an application that can vary the loss in compressed GIF image 300 on a regional basis given a source image 100, an image quality mask 200, and a color table 360. The application receives an image 100 and color table 360 (step 400), and creates and initializes an output GIF image 300 that includes a compression table (step 401). In initialization step 401, the application creates and saves in GIF image 300's compression table a unique string identifier for each color word in color table 360, and initializes a prefix string to the color word of the first pixel of image 100. The color words in color table 360 can be, e.g., 24 bit words whose first, second, and third bytes specify the red, green, and blue components, respectively, of a color stored in color table 360.

The application then loops through and processes each pixel in source image 100 until the last pixel is processed (steps 402 to 412). For each pixel, the application creates a search string by appending the pixel's color word to the prefix string (step 403). The application then receives an image quality value from a corresponding pixel in image quality mask 200 (step 404), and uses the image quality value to search the compression table of GIF image 300 for a string that "matches" the, search string (step 405).

A compression table string "matches" the search string if the distance metric between the two strings is less than some value derived from the image quality value received at step 404. For example, in one implementation a compression table test string "matches" a search string if the distance metric D between the search and test strings satisfies:

$$D \leq 4 \cdot (100-x)^2 + 1 \quad \text{(Eq. 1)}$$

where x is the image quality value received at step 404. The distance metric D is a measure of the color distance between the pixel colors of all of the pixels that comprise the search and test strings. Since a new value of x can be received at step 404 for each pixel in image 100, image quality mask 200 can control the acceptable amount of loss in converted GIF image 300 on a per pixel basis. In one implementation, the distance metric D measures the cumulative perceptual color distance between the pixel colors of all of the pixels comprising the search and test strings. In that implementation, D can be written:

$$D = \sum_{i=1}^{N} [6 \cdot (s_i(g) - t_i(g))^2 + 3 \cdot (s_i(r) - t_i(r))^2 + 2 \cdot (s_i(b) - t_i(b))^2] \quad \text{(Eq. 2)}$$

where the first, second, and third parenthetical terms in Eq. 2 respectively represent the difference in the green, red, and blue color components of the ith pixel in the search (s) and test (t) strings and the summation is over the N pixels comprising the search and test strings.

If the application finds a test string in the compression table of GIF image 300 that "matches" the search string (step 406), the application overwrites the search string's prefix string with the matching test string (step 411). If instead, the application fails to find a test string in GIF image 300's compression table that "matches" the search string (step 406), the application creates a string identifier to uniquely identify the search string (step 407), writes the search string and its unique string identifier to the compression table of GIF image 300 (step 408), writes the unique string identifier of the search string's prefix string to GIF file 300 (step 409), and overwrites the search string's prefix string with the current pixel's color word (step 410).

Once the application has either found a matching test string and overwritten the prefix string with it (step 411) or failed to find a matching test string and overwritten the prefix string with the current pixel's color word (step 410), the application checks whether the current pixel is the last pixel in image 100 (step 412). If the current pixel is not the last pixel in image 100, the application gets and processes the next pixel (step 402). If the current pixel is the last pixel in the image, the application writes the prefix string's unique string identifier to GIF file 300 (step 413), then exits (step 414).

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of embodiments of the invention have been described. Nevertheless, it will be understood that various modifications may be made without departing from the spirit and scope of the invention. For example, while the application has been described in terms of a portrait image 100 having only 3 regions of interest, image 100 can have any number of regions of variable interest. In particular, image quality mask 200 can specify a separate image quality level for each pixel in image 100. Alternatively image quality mask 200 can be represented as a resolution independent object or function and can specify a continuum of image quality levels. Similarly, while image quality mask 200 has been described as an array of 8-bit words, the mask can be stored as an array of arbitrarily sized words. For example, the mask can be stored as an array of 16 bit words with each array element specifying 65,536 discrete image quality levels.

While the invention has been described in terms of converting image 100 to a GIF image using a lossy LZW compression algorithm, the invention can be used in any application which compresses an image file using a dictionary or table based lossy compression algorithm. The compressed image need not be a GIF image, and the compression algorithm need not be a lossy LZW algorithm. While the distance metric between the search and test strings has been defined as in Eq. (2) other distance metrics can be defined. For example, the distance metric can be an absolute distance metric, or it can depend quadratically or cubically on the difference between pixel color components. Similarly, while the distance metric in Eq. (2) represents the cumulative distances averaged over all of the pixels in a search and test string, a distance metric can be used that requires a minimum distance between each corresponding pixel in the search and test strings.

While the pixel colors and distance metrics have been described in terms of the red, green, and blue color space, other color spaces such as the cyan, yellow, magenta, and black color spaces can be used. While the maximum allowable distance D has been defined in terms of the image quality level in image quality mask 200 as in Eq. (1), other maximum allowable distances D can be derived from the image quality level mask. For example, D can be equal to the value stored in the image quality level mask, or to any function of that value.

While the acceptable amount of loss in a file undergoing compression has been expressed as an image quality in an image quality mask, the acceptable amount of loss can equally be expressed as a loss level in an image loss mask. An image loss level will be inversely related to an image quality level, such that when the image quality level is high the image loss level is low, and when the image quality level is low, the image loss level is high. These and other embodiments of the invention are within the scope of the following claims.

What is claimed is:

1. A method for generating a compressed image from a source image, comprising:

receiving a source image;

receiving an image quality mask corresponding to the source image, wherein the image quality mask contains regional image quality levels specifying the degree to which information in corresponding regions of the source image can be lost when generating the compressed image; and generating the compressed image by compressing the source image using a dictionary based lossy compression algorithm that regionally varies the amount of information loss from the source image based on the regional image quality levels contained in the image quality mask.

2. The method of claim 1, wherein the received image quality mask is an alpha channel of the received source image.

3. The method of claim 1, wherein the lossy compression algorithm is a lossy Lempel-Ziv-Welch (LZW) compression algorithm.

4. The method of claim 1, wherein the received image quality mask is stored as a raster map.

5. The method of claim 1, wherein the received image quality mask is stored as a resolution independent function.

6. The method of claim 1, wherein the received image quality mask is determined by a user.

7. The method of claim 1, wherein the received image quality mask is automatically generated from the received image.

8. The method of claim 1, wherein the received image quality mask is automatically generated from user input.

9. A method for generating a compressed image from a source image, the method comprising:

receiving a source image having an associated image quality mask;

creating a compressed image having a compression table comprising a palletized table of colors and a plurality of identification strings respectively corresponding to each of the colors in the palletized table of colors;

initializing a prefix string with the color value of a first pixel in the source image; and subsequently processing each pixel in the source image by creating a search string by concatenating the pixel's color value to the end of the prefix string;

determining an image quality value from a corresponding pixel in the image quality mask associated with the source image;

searching the compression table for a color string that matches the search string;

writing the search string to the prefix string to overwrite the prefix string when a matching color string is found; and generating an identification string to associate with the search string;

writing the identification string and the search string to the compression table;

writing the identification string associated with the prefix string to the compressed image file; and setting the prefix string to the pixel's color value whenever a matching color string cannot be found.

10. The method of claim 9, wherein the image quality value represents the maximum allowable difference between the search string and a color string stored in the compression table.

11. The method of claim 10, wherein a color string stored in the compression table matches a search string when a distance metric between the color string and the search string is smaller than a function of the image quality value.

12. The method of claim 11, wherein the distance metric is a perceptual color distance metric.

13. A computer program product, stored on a machine readable medium, comprising instructions operable to cause a programmable processor to:

receive a source image;

receive an image quality mask corresponding to the source image, wherein the image quality mask contains regional image quality levels specifying the degree to which information in corresponding regions of the source image can be lost when generating the compressed image; and generate the compressed image by compressing the source image using a dictionary based lossy compression algorithm that regionally varies the amount of information loss from the source image based on the regional image quality levels contained in the image quality mask.

14. The computer program product of claim 13, wherein the received image quality mask is an alpha channel of the received source image.

15. The computer program product of claim 13, wherein the lossy compression algorithm is a lossy Lempel-Ziv-Welch (LZW) compression algorithm.

16. The computer program product of claim 13, wherein the received image quality mask is stored as a raster map.

17. The computer program product of claim 13, wherein the received image quality mask is stored as a resolution independent function.

18. The computer program product of claim 13, wherein the received image quality mask is determined by a user.

19. The computer program product of claim 13, wherein the received image quality mask is automatically generated from the received image.

20. The computer program product of claim 13, wherein the received image quality mask is automatically generated from user input.

21. A computer program product, stored on a machine readable medium, comprising instructions operable to cause a programmable processor to:

receive a source image having an associated image quality mask;

create a compressed image having a compression table comprising a palletized table of colors and a plurality of identification strings respectively corresponding to each of the colors in the palletized table of colors;

initialize a prefix string with the color value of a first pixel in the source image; and to subsequently process each pixel in the source image by creating a search string by concatenating the pixel's color value to the end of the prefix string;

determining an image quality value from a corresponding pixel in the image quality mask associated with the source image;

searching the compression table for a color string that matches the search string;

writing the search string to the prefix string to overwrite the prefix string when a matching color string is found; and generating an identification string to associate with the search string;

writing the identification string and the search string to the compression table;

writing the identification string associated with the prefix string to the compressed image file; and setting the prefix string to the pixel's color value whenever a matching color string cannot be found.

22. The computer program product of claim 21, wherein the image quality value represents the maximum allowable difference between the search string and a color string stored in the compression table.

23. The computer program product of claim 22, wherein a color string stored in the compression table matches a search string when a distance metric between the color string and the search string is smaller than a function of the image quality value.

24. The computer program product of claim 23, wherein the distance metric is a perceptual color distance metric.

* * * * *